United States Patent [19]
Crothers

[11] Patent Number: 5,147,669
[45] Date of Patent: * Sep. 15, 1992

[54] EDIBLE COOKIE BITS PRODUCTS

[75] Inventor: William G. Crothers, Princeton, N.J.

[73] Assignee: Deer Park Baking Company, Hammonton, N.J.

[*] Notice: The portion of the term of this patent subsequent to Aug. 9, 2000 has been disclaimed.

[21] Appl. No.: 691,171

[22] Filed: Apr. 24, 1991

Related U.S. Application Data

[63] Continuation of Ser. No. 356,643, May 22, 1989, abandoned, which is a continuation of Ser. No. 74,318, Jul. 10, 1987, abandoned, which is a continuation of Ser. No. 464,595, Feb. 7, 1983, abandoned, which is a continuation-in-part of Ser. No. 228,292, Jan. 26, 1981, Pat. No. 4,381,697, which is a continuation-in-part of Ser. No. 240,895, Mar. 5, 1981, Pat. No. 4,397,881, which is a continuation-in-part of Ser. No. 31,402, Apr. 19, 1979, Pat. No. 4,397,880.

[51] Int. Cl.$^5$ .................. A21D 13/08; A23G 9/02
[52] U.S. Cl. ..................... 426/94; 426/101; 426/104; 426/302; 426/304; 426/306; 426/549; 426/565; 426/572
[58] Field of Search ............ 426/101, 94, 104, 549, 426/565, 572, 247, 304, 302, 306

[56] References Cited

U.S. PATENT DOCUMENTS

| | | | |
|---|---|---|---|
| D. 241,685 | 10/1976 | Warren | D1/4 |
| 4,397,880 | 8/1983 | Crothers | 426/565 |
| 4,397,881 | 8/1983 | Crothers | 426/565 |

OTHER PUBLICATIONS

Ralph M. Bohn, Biscuit and Cracker Production, American Trade Publishing Co., New York, 1957, pp. 146–149.

L. Russell Cook, Chocolate Production and Use, Magazines for Industry, Inc., New York, New York, 1963, pp. 345–346.

Eileen Tighe, Woman's Day Encyclopedia of Cookery, vol. 3, Fawcett Publications, Inc., New York, 1966, p. 467.

Family Circle Illustrated Library of Cooking, vol. 5, The Family Circle, Inc., 1972, pp. 564 and 606.

June Roth, Old-Fashioned Candymaking, Henry Regnery Co., Chicago, 1974, pp. 122, 123, 130–133, 135, 150, 151.

W. S. Arbuckle, Ice Cream, AVI Publishing Co., Inc., Westport, Connecticut, 1977, pp. 26 and 388.

*Primary Examiner*—Jeanette Hunter
*Assistant Examiner*—Mary S. Mims
*Attorney, Agent, or Firm*—Stephen E. Feldman

[57] ABSTRACT

Small cookies, known as cookie bits, are combined with other ingredients, especially chocolate, as the basis of finished candy products or other edible cookie bits products. The product entails using a tiny cookie as an ingredient in chocolate bars or clusters, ice cream items, or in candy items, as a substitute for fruits and nuts, in the fields of ice cream, candy and cereal, and as a replacement for nuts, fruits and chocolate chips. The cookie bit may be the center of panned items, usually elliptical or spherical in shape, in which the cookie bit per se is covered with chocolate and an outer coating of candy glaze or sugar coating and polish. The present cookie bit product features the cookie bit itself as an ideal ingredient for a candy bar producer to mold into the bar or cluster in place of, or along with, nuts and fruits. The uniqueness in size of the cookie bit is related to the use of the cookie bit as an ingredient; the cookie bit will generally have a size in the range of about 500 to 3,000 count per pound.

16 Claims, 3 Drawing Sheets

EDIBLE COOKIE BITS PRODUCTS

CROSS REFERENCE TO RELATED APPLICATIONS

The present application is a continuation of U.S. Pat. applications Ser. No. 07/365,643 filed May 22, 1989, now abandoned, which is a continuation of Ser. No. 07/073,318 filed Jul. 10, 1987, now abandoned, which is a continuation of Ser. No. 06/464,595 filed Feb. 7, 1983, now abandoned, which is a continuation-in-part of Ser. No. 06/228,292 filed Jan. 26, 1981, now U.S. Pat. No. 4,381,697, which is a continuation-in-part of Ser. No. 06/240,895 filed Mar. 5, 1981, now U.S. Pat. No. 4,397,881, which is a continuation-in-part of Ser. No. 06/031,402 filed Apr. 19, 1979 now U.S. Pat. No. 4,397,880.

BACKGROUND OF THE INVENTION

1. Field Of The Invention

An edible product containing discrete particulate cookies in situ or in a matrix.

2. Description Of The Prior Art

Machines and machinery for forming dough, and making very small or tiny cookies, known as cookie bits, are shown and described in my U.S. Pat. No. 4,349,574; my Canadian Pat. No. 1,134,677, and in my aforementioned U.S. Pat. Application, Ser. No. 228,292 filed Jan. 26, 1981 and now allowed. The disclosures of these teachings are incorporated herein by reference.

The food industry and especially the ice cream industry was desirous of incorporating a cake product into food substances and ice cream, but the prior art cake products would tend to either break down into fine pieces and thus "dirty" the food product, i.e., the ice cream, or remain so hard and rough as to be undesirable to the palate in eating soft ice cream.

Heretofore it was also known in the prior art to incorporate various foods particulates into ice cream. Hassell, U.S. Pat. No. 1,901,394 granted Mar. 14, 1933, discloses the incorporation of popcorn and peanuts into ice cream. Anagnos, U.S. Pat. No. 1,968,732 granted Jul. 31, 1934, discloses incorporating candy or nuts into ice cream. Musher, U.S. Pat. No. 2,355,028 disclosed an oat product in ice cream. Forkner, U.S. Pat. No. 3,020,164 granted Feb. 6, 1962, discloses candy bits in ice cream. And Durst, et al, U.S. Pat. No. 3,872,229 granted Mar. 18, 1975, incorporates a simulated nutmeat product into ice cream.

Such prior art particulates were generally hard and irregularly-shaped and retained their hard or tough quality when incorporated into the ice cream.

In the fields of edible ice cream and candy products cookie crumbs have been used extensively and may find increased use in the future (cookie crumbs are the result of further processing of finished, baked cookies; that is, the cookies are baked, then broken into pieces sized by various screens). The crumbs might be ideal for topping or as a filler. However, the present complete tiny cookie which can be handled by the processing equipment of the end producer of ice cream and candy products (keeping its integrity) is the perfect replacement for nuts, fruits, and chocolate chips.

SUMMARY OF THE INVENTION

It is an object of the present invention to provide an improved edible food product, as an article of manufacture.

Another object is to provide an improved edible cookie bit product.

A further object is to provide an edible food product in which small or tiny discrete particulate cookies of specific size configuration serve as a substitute for nuts, fruits, chocolate chips, etc., in such foods as chocolate bars or clusters, ice cream items, candy items, cereal, etc.

An additional object is to provide an improved edible chocolate candy or food product, in which a cookie bit is the center of a panned item, usually elliptical or spherical in shape, in which each discrete cookie bit per se is covered with chocolate and an outer coating of candy glaze or sugar coating and polish.

Still another object is to provide an edible cookie bit product in which the cookie bits, because of their small size in the range of about 500 to 3,000 count per pound, are an ideal replacement for nuts, fruits, chocolate chips, etc., in diverse edible food items, such as chocolate bars or clusters, ice cream items, candy items, cereal, etc.

Still a further object is to provide an edible food product in which cookie bits of specific size and/or configuration are incorporated into the product, so as to provide a low-cost substitute for nuts, raisins or other fruits, chocolate chips, etc.

Still an additional object is to provide an improved edible cookie bit product which is more nutritious than, and has more stability in terms of shelf life than, a nutted or raisin product, especially in terms of attracting or generating worms or mold.

Yet another object is to provide an edible cookie bits product which is free flowing and features less breakage and greater resistance to crumbling.

Yet a further object is to provide an edible cookie bits product which is cheaper than prior art products using nuts, fruits, chocolate chips, etc., dispersed in a matrix or body of ice cream, chocolate or the like.

Yet an additional object is to make and use tiny cookie bits of specific small size range for molding into a chocolate bar; "panning" the cookie; or using it to make a "cookie" cluster as a "nut" cluster, in which the discrete particulate elements are enrobed in chocolate.

An object is to provide a food product in which a complete, small cookie can be run on the same equipment presently used by candy manufacturers or ice cream producers.

An object is to reduce costs and attain great savings in the raw material cost in using the cookie bits in place of, or in addition to, nuts or fruits (or pieces of the latter two), so long as flour, sugar and shortening cost less than the items being replaced.

An object is to provide an edible cookie bits product which features small cookies, namely cookie bits, in combination with other ingredients, as the basis of finished candy products, ice cream items, or cereal.

An object is to provide cookie bits as an ideal ingredient for a candy bar producer to mold into the bar in place of, or along with, nuts and fruits, e.g., a "fruit and cookie" bar.

An object is to provide an application for cookie bits in the candy field, in which the cookie bit, as the center of a panned item, would typically be elliptical or spherical in shape, to solve the problem of "doubles" which occur when the cookie has too much flat surface.

An object is to provide an improved candy piece consisting of a cluster, in which the piece is made by laying down a bed of cookie bits, tying clusters of cookie bits together with caramel, and then enrobing the total piece with chocolate.

These and other objects and advantages of the present invention will become evident from the description which follows.

BRIEF DESCRIPTION OF THE INVENTION

In summary, in the present invention, small cookies, known as cookie bits, are combined with other ingredients, especially chocolate, as the basis of finished candy products or other edible cookie bits products. The product entails using a tiny cookie as an ingredient in chocolate bars or clusters, ice cream items, or in candy items, as a substitute for fruits and nuts, in the fields of ice cream, candy and cereal, and as a replacement for nuts, fruits and chocolate chips. The cookie bit may be the center of panned items, usually elliptical or spherical in shape, in which the cookie bit per se is covered with chocolate and an outer coating of candy glaze or sugar coating and polish. The present cookie bit product features the cookie bit itself as an ideal ingredient for a candy bar producer to mold into the bar or cluster in place of, or along with, nuts and fruits. The uniqueness in size of the cookie bit is related to the use of the cookie bit as an ingredient; the cookie bit will generally have a size in the range of about 500 to 3,000 count per pound.

To be more specific with regard to the invention as contemplated, the present application is directed to an article of manufacture consisting of an edible cookie bit product comprising at least one cookie bit, the cookie bit being a small edible cookie comprising flour, sugar and shortening, the cookie bit having a size in the range of about 500 count per pound to about 3,000 count per pound. The cookie bit is porous, whereby the cookie bit absorbs moisture but retains its shape and structural integrity, in contact and blend with an edible coating or an edible foodstuff in which the cookie bit is dispersed, after such moisture absorption, the cookie bit being coated with, or blended or dispersed into and covered with, the edible coating or the edible foodstuff, so that the cookie bit is not visible in the finished edible product article of manufacture.

In a preferred embodiment, the present edible cookie bit product is characterized by the provision of cookie bits of conical shape and formed as a cone with a rounded apex and base. Typically, a plurality of cookie bits are present in an edible foodstuff in an amount of about 8% to about 10% by weight of the edible foodstuff. Generally, the sugar : shortening ratio in the cookie bit is from 1.5:1 to 2.5:1. In a preferred embodiment, the cookie bit has a size in the range of about 1,000 count per pound to about 1,500 count per pound.

Typically, the edible coating is chocolate and the shape of the resultant chocolate-coated cookie bit is spherical, oval, elliptical or conical, the resultant cookie bit being an edible product. In this mode of practice of the invention, the edible product is usually produced by panning or the dragee process. In addition, preferably the edible product is further coated or sprayed with an external layer of candy glaze or sugar coating and polish.

In an alternative embodiment, the edible foodstuff is ice cream, and a plurality of the cookie bits are dispersed in the ice cream.

In another variation, the edible foodstuff is chocolate and a plurality of the cookie bits are dispersed in the chocolate, so that a chocolate body is formed with integral internal cookie bits enrobed within the chocolate. In this case, the chocolate body may be in the form of a molded chocolate bar, and the chocolate body may also contain an internal integral plurality of discrete particulate pieces of fruit, such as dates, raisins, orange peel, lemon peel, figs, and lime peel. The chocolate body may also be in the form of a cluster or turtle. In this case, preferably the cluster or turtle is formed by laying down a bed comprising a plurality of cookie bits, tying clusters of the cookie bits together with caramel, and then enrobing each total piece with chocolate.

Generally, the article of manufacture is an edible product selected from the group consisting of a candy, a cereal, a pet food and an edible toy. Typically, the edible toy is an edible bullet for a toy gun. Alternatively, the edible cookie bit product comprises a plurality of discrete separate and individual bodies, each body having a single cookie bit substantially at its center. Preferably, the sugar used in the cookie bits comprises the combination of a sucrose and an invert sugar.

The invention, accordingly, consists in the features of construction, combination of elements, and arrangement of parts, which will be exemplified in the article of manufacture and edible composition of matter hereinafter described, and of which the scope of application is as elucidated supra, and as will be indicated in the appended claims.

BRIEF DESCRIPTION OF THE DRAWINGS

In the accompanying drawings are shown several of the various possible embodiments of the invention.

DETAILED DESCRIPTION OF THE PREFERRED EMBODIMENTS

Figure 1:
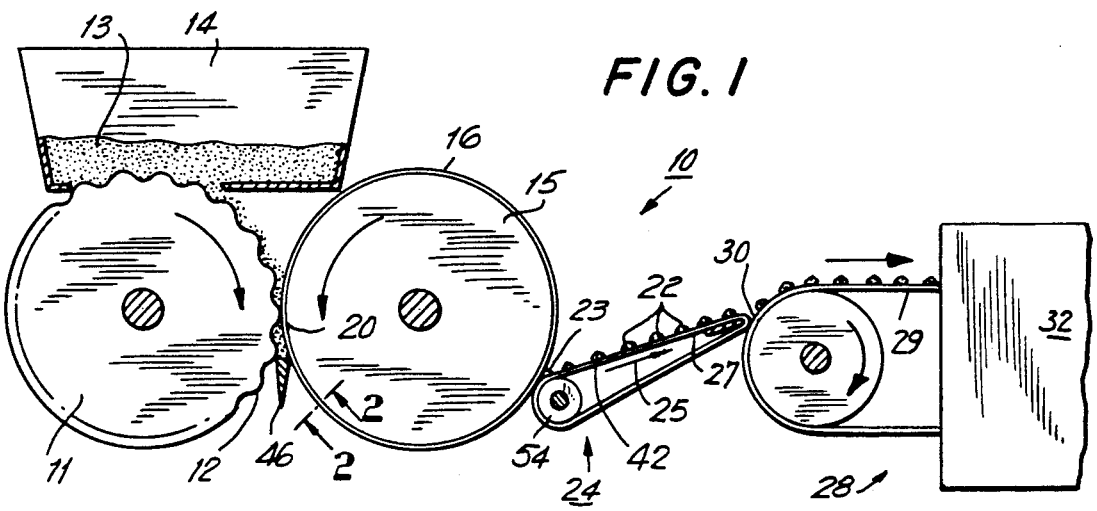
FIG. 1 is a side view of flowsheet showing a cookie machine, i.e. a preferred processing schematic showing the preferred apparatus for producing the cookie bits.

Referring now to FIG. 1, there is shown a preferred processing schematic showing the preferred apparatus for producing the cookie bits, wherein the apparatus is generally referred to as numeral 10. This apparatus is described in more detail in my patent entitled METHOD AND APPARATUS TO MAKE COOKIES, U.S. Pat. No. 4,229,487 granted Oct. 21, 1980. Apparatus 10 comprises a feed roll 11 which is formed of corrugated metal 12 mounted on a periphery of the roll 11. Roll 11 rotates so as to pick up cookie dough 13 from feeder 14. Roll 11 is in contact with drum 15 on which is mounted cylindrical metal roll 16. Roll 16 is formed with a plurality of inverted cavities 17 which are shown as conical impressions, best shown in FIG. 2, and is Teflon-coated, as shown, with lining 60.

Each cavity 17 is of depth 18 which is equal to the diameter 19 of the crevice, which dimensions are approximately 3/16th of an inch. The metal roll 16 is highly polished so that the dough 13 will flow readily into and out of the cavities 17.

Figure 2:
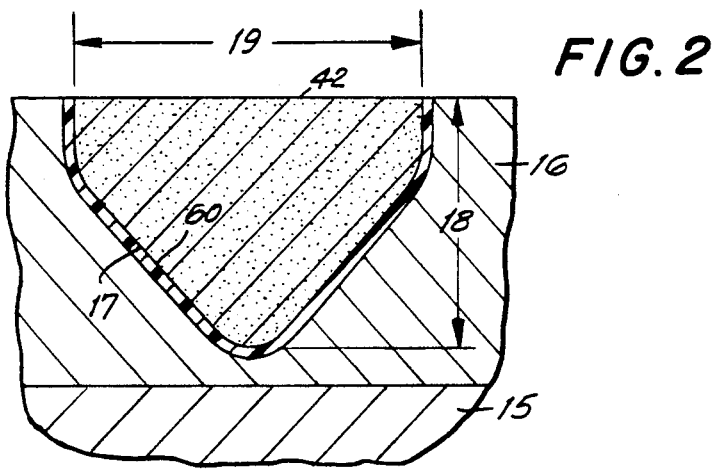
FIG. 2 is a partial sectional view of a portion of the cylindrical rotary die roll in FIG. 1.

Dough 13 is picked up by the corrugations on roll 11 and pressed into the cavities 17 at point of contact 20. The drum roll 15 is then rotated until doctor blades 46 strip off the excess dough. Once the drum 15 rotates to a point still below the horizon, the dough cones or bits 22 are pulled out of the cavities 17 onto the section 23 of conveyor 24 by the frictional force of conveyer belt section 23, through the pressing contact of rubber roller 54, against the dough surface 42 (FIG. 2). The cones 22 are conveyed upwardly as at 25 on endless conveyor belt 27.

A second conveyor 28 is disposed proximate conveyer 24 and belt 29 of conveyor 28 contact belt 27 at point 30. The belts 27 and 29 thus form an upward ramp so that bits 22 are transferred from belt 27 onto belt 29. This is contrary to conventional cookie transfer wherein the cookies are transported downward from the feed belt to the receiving belt. However, with the small shape, such downward feeding is not feasible insofar as the bit, by virtue of the high center of gravity, would tip over during belt transfer.

It has been found that in the specific upward transfer, as shown and described herein, the dough bits 22 remain upright.

Figure 3:
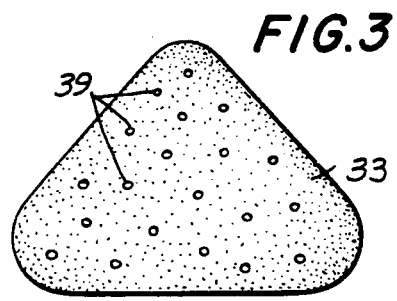
FIG. 3 shows a typical cookie bit, i.e. a small conical or pyramidal cookie, in elevation view.

The dough bits 22 are transferred via belt 29 to oven 32 whereat the bits are then baked to form the finished cookie bits 33, best shown in FIG. 3.

In a more specific aspect, this invention comprises cookie bits as aforementioned which can be used alone or incorporated into various food substances, including ice cream, and retain an acceptable taste and consistency in the food substances. In ice cream, the cookie bits absorb some moisture from the ice cream, but do not break down, and in fact retain a true cake-like consistency in the ice cream.

Bit 33 is formed with a plurality of pores 39 which permit the absorption of a certain amount of moisture, such as the water present in ice cream.

Figure 4:
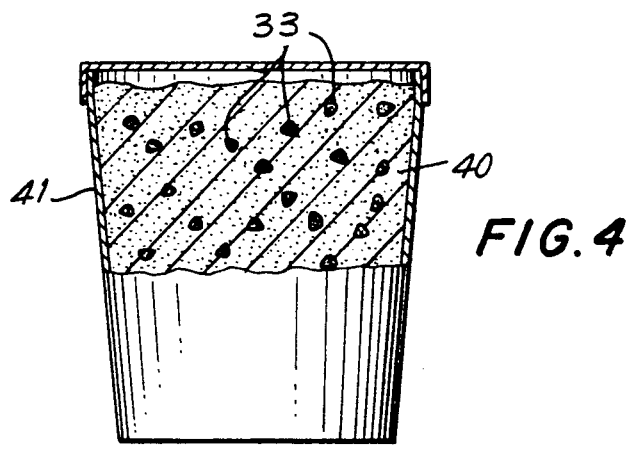
FIG. 4 shows a plurality of cookie bits immersed in a matrix, e.g. ice cream.

The bits 33, by virtue of the novel configuration, may be conventionally screw-impeller blended with the food substance such as ice cream to form a bulk product 40 in container 41 having the bits 33 dispersed in the food substance (FIG. 4). The cookie bits 33, unlike conventional flat cookies, retain their dimensional integrity despite the mechanical blending action. The bits compose about 8 to 10% of the food substance by weight.

Following is a typical cookie bit formulation of the invention, namely an edible cookie bits product:

TABLE I

| Ingredient | Cookie Confection Wet Wt. (lbs) | Dry Wt. (lbs) |
| --- | --- | --- |
| Flour | 260 | 228 |
| Sugar | 102 | 102 |
| Invert Sugar | 7 | 4.5 |
| Shortening | 85 | 85 |
| Leavening (AMMONIUM BI-CARBONATE) | 1.5 | — |
| Baking Soda | .4 | .2 |
| Vanilla | 1 oz. | — |
| Water | 22 | — |
| Yellow Solution | .1 | — |
| Salt | 1.5 | 1.5 |
| Egg Powder | 3 | 2.5 |
| Baking Powder | .25 | .1 |
| Lecithin | .1 | .1 |

The aforementioned composition was formed into bits. The bits are coated with caramel and/or chocolate or compound coatings.

The dough is mixed and baked under conventional processing operations and conditions as is well known is the art.

In one typical embodiment of the aforesaid composition, there is a total of 76 lbs. of sugar (cane plus invert) and a total of 43 lbs. of shortening (including 15% cocoa fat in a total of 20 lbs. of cocoa). Therefore, the ratio of sugar to shortening is about 1.8:1.

Without wishing to be bound by any theory or mechanism, it has surprisingly been found that the composition having the specified sugar:shortening ratio, when formed and baked as a cookie bit, provides a structure which will maintain its structural integrity when dispersed in food substances such as ice cream, and yet absorbs water to some degree, so as to provide a pleasant cake taste and texture to the customer.

Figure 5:
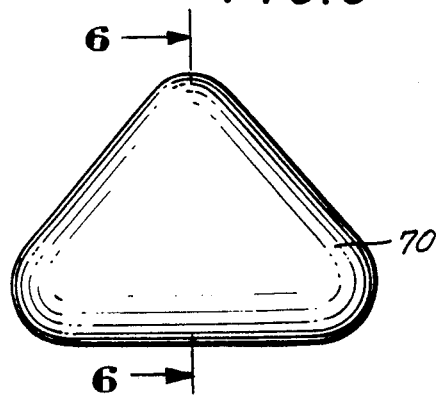
FIG. 5 shows a chocolate covered cookie bit.
Figure 6:
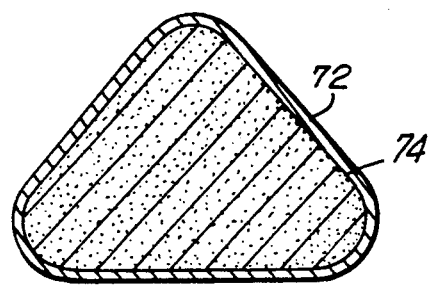
FIG. 6 is a sectional elevation view of the cookie bit of FIG. 5.
Figure 7:
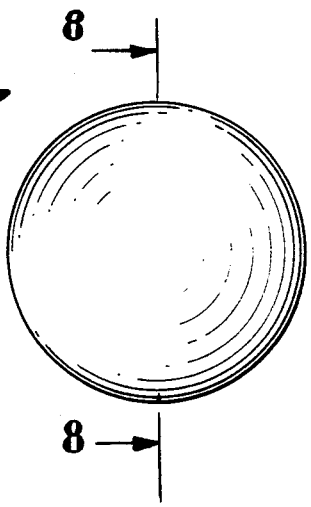
FIG. 7 shows a glazed chocolate covered cookie bit ovoid or spherical shape.
Figure 8:
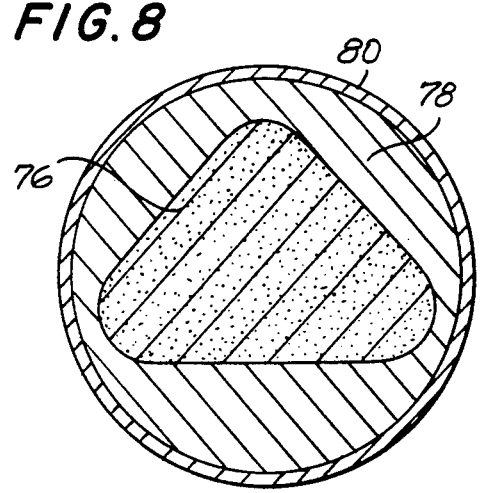
FIG. 8 is a sectional elevation view of the cookie bit of FIG. 7.
Figure 9:
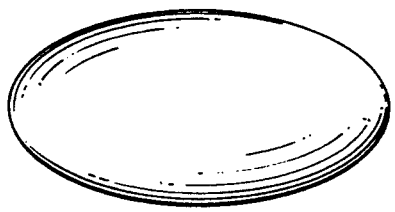
FIG. 9 shows an alternative to the FIG. 7 configuration, in which the glazed chocolate covered cookie bit is elliptical or oval.
Figure 10:
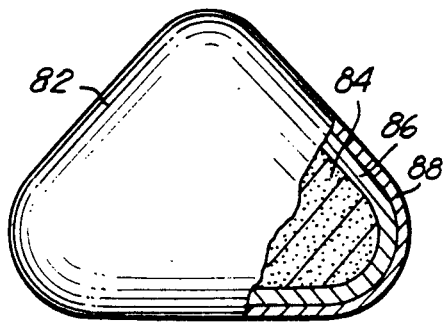
FIG. 10 shows a pyramid or conical shape glazed chocolate covered cookie.
Figure 11:
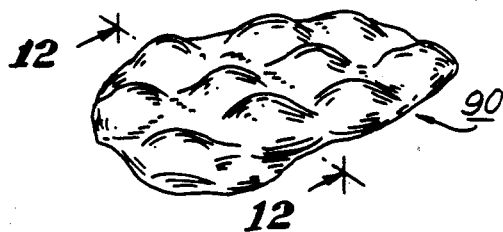
FIG. 11 shows a cookie bit cluster.
Figure 12:
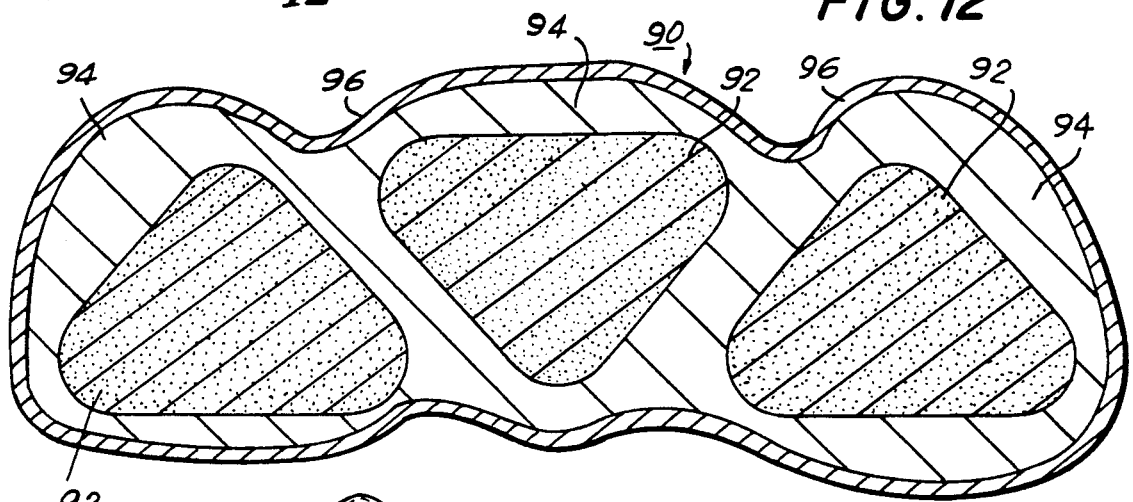
FIG. 12 is a sectional elevation view of FIG. 11.
Figure 13:
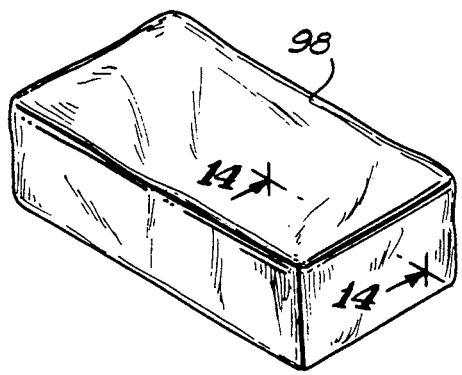
FIG. 13 shows a filled chocolate bar containing, inter alia, internal cookie bits.
Figure 14:
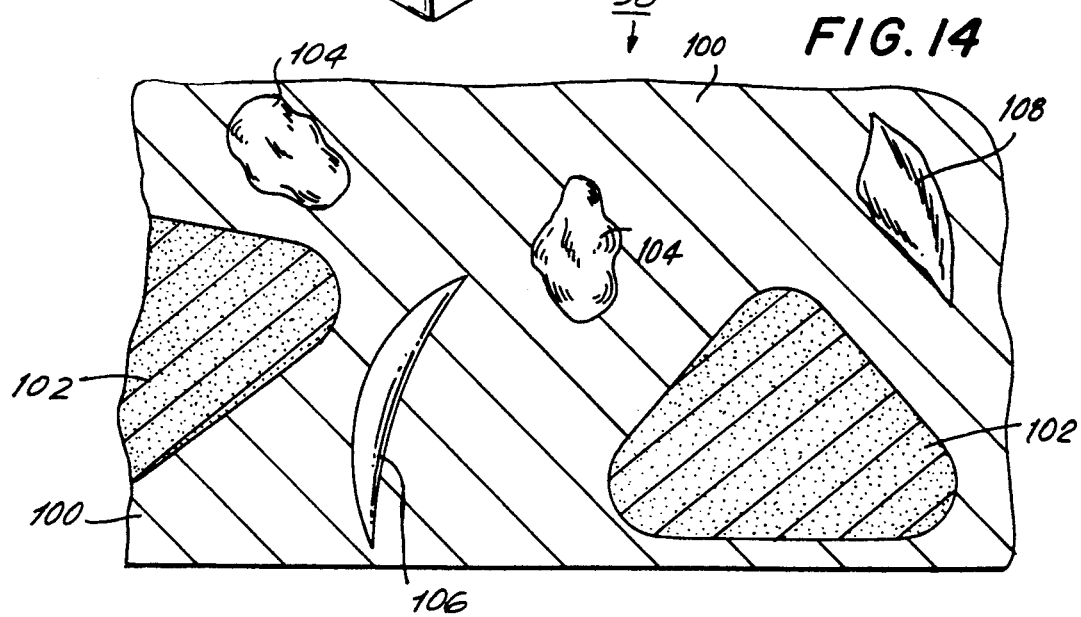
FIG. 14 is a sectional elevation view of a portion of FIG. 13.

FIGS. 5 and 6 show a chocolate covered cookie bit 70 in which a chocolate layer 72 is disposed evenly about and over the outer surface 74 of the cookie bit 70. FIGS. 7, 8, and 9 show preferred configurations of coated and enrobed cookie bits, in which the product is produced by panning and spray-coating of glaze; i.e.,- FIG. 8 shows the central enrobed cookie bit 76 surrounded by a chocolate body 78 and an outer glaze coating 80. FIG. 10 shows an alternative embodiment of plural coating and enrobing in which the product 82 retains the general pyramidal or conical shape of the inner central cookie bit 84, which is coated successively with a chocolate layer 86 and an outer glaze coating 88. FIG. 11 shows a cookie bit cluster 90, in which (FIG. 12) the cluster is composed of the cookie bits 92 enrobed in a body or matrix 94 of caramel, or chocolate, which is in turn coated with chocolate or with sugar or candy glaze 96. FIG. 13 shows a chocolate bar 98, in which (FIG. 14) the bar is composed of a continuous chocolate body, mass, or matrix 100, in which are randomly oriented the cookie bits 102, the raisins 104, the fruit peel 106, and the fruit piece 108, the latter being composed, e.g., of a date, a fig, an apricot, or the like.

It thus will be seen that there is provided an edible cookie bits product, in which the cookie bit is combined with other ingredients, especially chocolate, which achieves the various objects of the invention, and which is well adapted to meet the conditions of practical use.

As various possible embodiments might be made of the above invention, and as various changes might be made in the embodiments above set forth, it is to be understood that all matter herein described or shown in the accompanying drawings is to be interpreted as illustrative and not in a limiting sense. Thus, it will be understood by those skilled in the art that although preferred and alternative embodiments have been shown and described in accordance with the Pat. Statutes, the invention is not limited thereto or thereby, since the embodiments of the invention particularly disclosed and described hereinabove are presented merely as an example of the invention. Other embodiments, forms, and modifications of the invention, coming within the proper scope and spirit of the appended claims, will, of course, readily suggest themselves to those skilled in the art. Thus, while there has been described what is at present considered to be the preferred embodiments of the invention, it will be obvious to those skilled in the art that various changes and modifications may be made therein, without departing from the invention, and it is, therefore, aimed in the appended claims to cover all such changes and modifications as fall within the true spirit and scope of the invention.

What is claimed is:

1. An edible article of manufacture for ingestion, said edible article comprising an edible cookie bit defined by a mixture of flour, sugar and shortening an baked into a predetermined size and into a predetermined shape, said edible cookie, after baking, having a predetermined structural characteristic, said predetermined size defined by the number of individual edible cookie bits in a pound of said edible cookie bits, said predetermined size in the range of 500 edible cookie bits per pound to about 3000 edible cookie bits per pound, said edible cookie bit having a surface defining said predetermined shape, said surface having a characteristic for absorbing an edible foodstuff into at least a portion of said surface while retaining said predetermined shape, said predetermined structural characteristic defined by the ability of said edible cookie bit for absorbing the foodstuff and retaining the structural integrity of said edible cookie bit, said edible foodstuff for coating said surface without compromising said predetermined shape but covering said edible cookie bit so that said surface is not visible in the finished edible article of manufacture.

2. The edible article of manufacture of claim 1 and in which said surfaces defines a cone with a rounded apex and a base.

3. The edible article of manufacture of claim 1 and in which, after said edible foodstuff is absorbed into said surface of said edible cookie bit, said edible cookie bit has been increased in weight by 8% to 10% of the weight of the edible cookie bit, thereby reducing the number of edible articles of manufacture in a pound.

4. The edible article of manufacture of claim 1 in which the sugar to shortening ratio in said edible cookie bit is between 1.5 to 1 and 2.5 to 1.

5. The edible article of manufacture of claim 1 and in which said edible foodstuff is chocolate and said predetermined shape of said edible cookie bit as defined by said surface is spherical, oval, elliptical or conical.

6. The edible article of manufacture of claim 5 in which said surface of said edible cookie bit is sprayed with a layer of candy glaze or sugar coating after said edible foodstuff is absorbed by said surface.

7. The edible article of manufacture of claim 1 and in which said edible food stuff is ice cream and a plurality of edible cookie bits are dispersed in said ice cream.

8. The edible article of manufacture of claim 1 and in which said edible foodstuff is a first chocolate and a plurality of edible cookie bits with said surface coated with said first chocolate are dispersed in a second chocolate for forming a third chocolate edible product with integral internal edible cookie bits enrobed with said second chocolate.

9. The edible article of manufacture of claim 8 in which said third chocolate edible product is in the form of a molded chocolate bar.

10. The edible article of manufacture of claim 8 in which said third chocolate edible product further includes an internal integral plurality of discrete particular pieces of fruit.

11. The edible article of manufacture of claim 10 in which said plurality of discrete particular pieces of fruit are selected from the group of raisins, dates, figs, orange peel, lemon peel and lime peel.

12. The edible article of manufacture of claim 8 in which said third chocolate edible product is in the form of a cluster or a turtle.

13. The edible article of manufacture of claim 1 in which said edible article of manufacture is a candy, a cereal, a pet food or an edible toy.

14. The edible article of manufacture of claim 13 in which said edible article of manufacture is an edible toy bullet for a toy gun.

15. The edible article of manufacture of claim 1 in which said edible article of manufacture comprises a plurality of discrete, separate and individual edible products, each edible product of said plurality of discrete, separate and individual edible products having a single edible cookie bit substantially at its center.

16. The edible article of manufacture of claim 1 in which the sugar in said mixture of flour, sugar and shortening is a combination of a sucrose and an invert sugar.

* * * * *